United States Patent
Huang et al.

(10) Patent No.: US 10,417,537 B2
(45) Date of Patent: Sep. 17, 2019

(54) METHOD FOR COMPENSATING COLORING RANGE OF COLORED 3D OBJECT

(71) Applicants: XYZPRINTING, INC., New Taipei (TW); KINPO ELECTRONICS, INC., New Taipei (TW)

(72) Inventors: Yu-Ting Huang, New Taipei (TW); Ko-Wei Shih, New Taipei (TW)

(73) Assignees: XYZPRINTING, INC., New Taipei (TW); KINPO ELECTRONICS, INC., New Taipei (TW)

( * ) Notice: Subject to any disclaimer, the term of this patent is extended or adjusted under 35 U.S.C. 154(b) by 238 days.

(21) Appl. No.: 15/607,435

(22) Filed: May 27, 2017

(65) Prior Publication Data

US 2018/0189618 A1 Jul. 5, 2018

(30) Foreign Application Priority Data

Jan. 5, 2017 (TW) .............................. 106100318 A

(51) Int. Cl.
*G06K 15/02* (2006.01)
*B33Y 50/02* (2015.01)
(Continued)

(52) U.S. Cl.
CPC ........ *G06K 15/1878* (2013.01); *B29C 64/118* (2017.08); *B29C 64/194* (2017.08);
(Continued)

(58) Field of Classification Search
CPC ..... B29C 41/00; B29C 64/118; B29C 64/386; B29C 64/393; G05B 19/4099;
(Continued)

(56) References Cited

U.S. PATENT DOCUMENTS 9,833,986 B1 * 12/2017 Susnjara ................. B29C 64/10
10,005,126 B2 * 6/2018 Page ...................... B22F 3/1055
(Continued)

FOREIGN PATENT DOCUMENTS

WO   WO-2015080975 A1 * 6/2015 ............. G06T 15/04
WO     2015178443 A1   11/2015
(Continued)

OTHER PUBLICATIONS

Search Report dated Nov. 20, 2017 of the corresponding European patent application No. 17168519.1.

*Primary Examiner* — Kenneth M Lo
*Assistant Examiner* — Majd Zaker
(74) *Attorney, Agent, or Firm* — Chun-Ming Shih; HDLS IPR Services

(57) ABSTRACT

A method for compensating coloring range of colored 3D object is disclosed. The method includes following steps: importing a 3D object; performing an object slicing process to the 3D object for generating multiple object printing-route information for multiple printing layers; performing an image slicing process to the 3D object for generating multiple color printing-route information for the multiple printing layers; performing an extension process to the color printing-route information for generating updated color printing-route information, the updated color printing-route information may cover extension blocks respectively generated from each sliced object after the sliced object is printed.

9 Claims, 8 Drawing Sheets

(51) Int. Cl.
*G06T 17/10* (2006.01)
*B33Y 10/00* (2015.01)
*B29C 64/393* (2017.01)
*B29C 64/118* (2017.01)
*B33Y 40/00* (2015.01)
*B29C 64/194* (2017.01)

(52) U.S. Cl.
CPC ............ *B29C 64/393* (2017.08); *B33Y 10/00* (2014.12); *B33Y 40/00* (2014.12); *B33Y 50/02* (2014.12); *G06K 15/1849* (2013.01); *G06T 17/10* (2013.01)

(58) Field of Classification Search
CPC ..... G06T 15/04; G06T 17/10; G06K 15/1878; G06K 15/1849; B33Y 10/00; B33Y 50/02
See application file for complete search history.

(56) References Cited

U.S. PATENT DOCUMENTS

| | | | |
|---|---|---|---|
| 2014/0277661 A1* | 9/2014 | Amadio | G05B 19/4099 700/97 |
| 2015/0142159 A1* | 5/2015 | Chang | B29C 67/0007 700/119 |
| 2016/0297150 A1* | 10/2016 | Ueda | G05B 19/4099 |
| 2017/0081538 A1* | 3/2017 | Wu | C09D 11/50 |
| 2018/0071980 A1* | 3/2018 | Lomasney | C25D 5/10 |
| 2018/0117845 A1* | 5/2018 | Buller | B29C 64/282 |
| 2018/0169953 A1* | 6/2018 | Matusik | B29C 64/393 |
| 2018/0370118 A1* | 12/2018 | Jiang | B29C 41/00 |
| 2018/0370122 A1* | 12/2018 | MacCormack | B29C 64/393 |
| 2019/0009456 A1* | 1/2019 | Biskop | B29C 64/112 |
| 2019/0047099 A1* | 2/2019 | Guo | B23Q 1/015 |

FOREIGN PATENT DOCUMENTS

| | | |
|---|---|---|
| WO | 2016003277 A1 | 1/2016 |
| WO | 2016186236 A1 | 11/2016 |

* cited by examiner

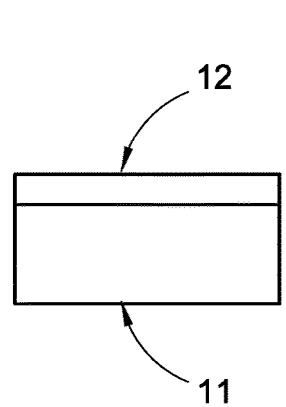
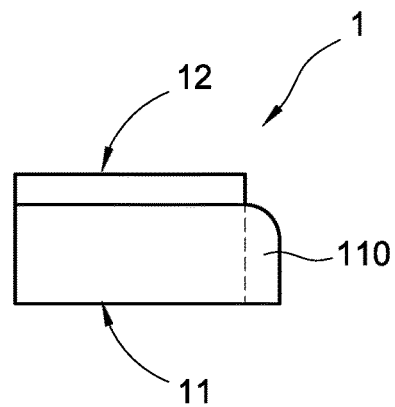
FIG.1A (Related Art)
FIG.1B (Related Art)
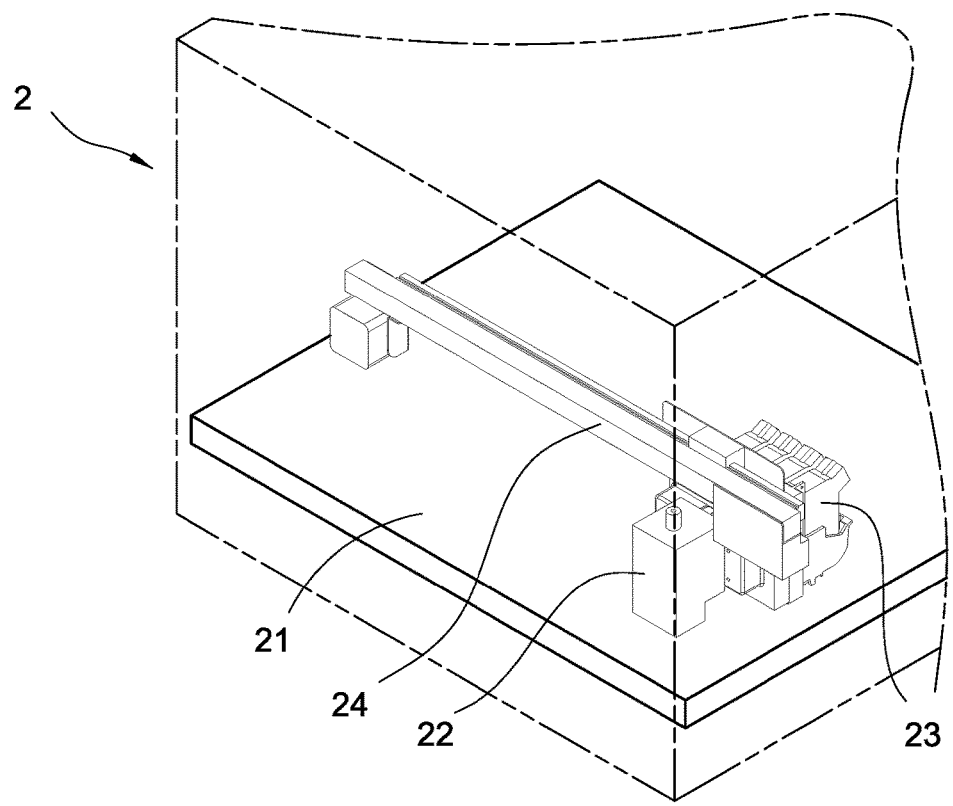
FIG.2

METHOD FOR COMPENSATING COLORING RANGE OF COLORED 3D OBJECT

BACKGROUND OF THE INVENTION

Field of the Invention

The technical field relates to a colored 3D object, especially to a method for compensating coloring range of colored 3D object.

Description of Prior Art

In view of maturity of 3D print technology, and reduced volume and price of 3D printer, 3D printer gets popular in recent years. For making a completely printed 3D model more acceptable to the user, some manufacturers have developed a 3D printer that can print a full-color 3D model.

The aforementioned 3D printer prints, while an object block is mainly formed by spraying material according to a printing route, then a coloring block is formed by directly spraying colored ink on the forming material according to the same or similar printing route, thus the object block is colored by the coloring block. In this way, a full colored 3D model can be formed through stacking colored object blocks.

Refer to FIG. 1A, FIG. 1A shows a sectional view of a first 3D object of related art. As shown in FIG. 1A, a 3D object 1 is mainly formed by an object block 11 and a coloring block 12 covering the object block 11. As described above, the 3D printer uses the same or similar printing route to print the object block 11 and to print the coloring block 12, thus the coloring block 12 could completely cover the object block 11 as shown in FIG. 1A. However, the coloring block 12 generated often cannot completely cover the object block 11 when printing, thus part of a contour of the printed 3D model is not colored.

Taking a fused deposition modeling (FDM) 3D printer for example, the 3D printer uses a thermoplastic wire as a forming material. The forming material has a particular weight itself, and sprays under molten condition, thus the object block 11 usually collapses and extends when printing.

Refer to FIG. 1B, FIG. 1B shows a sectional view of a second 3D object of related art. An adjacent extension block 110 is generated when the printed object block 11 collapses and extends. The printing route of the coloring block 12 does not record the extension block 110, thus when the 3D printer prints the coloring block 12 on the object block 11 according to the printing route, the extension block 110 will not be covered (that is, the object block 11 extending cannot be completely covered), and the extension block 110 cannot be colored.

SUMMARY OF THE INVENTION

The disclosure is directed to provide a method for compensating coloring range of colored 3D object, the method compensates coloring of extension block of an object.

In one of the exemplary embodiments, the method mainly includes the following steps: importing a 3D object by a processor; performing an object slicing process to the 3D object, for generating multiple object of multiple printing layers; performing an image slicing process to the 3D object, for generating multiple color printing route information of multiple printing layers; performing an extension process to the multiple color printing route information respectively, for generating multiple updated color printing route information. The updated color printing route information can cover an extension block generated by each sliced object printed.

In this way, a 3D printer controls a 3D nozzle to sequentially print sliced object of multiple printing layers according to the multiple printing route information, and controls a 2D nozzle to perform coloring to the sliced object of each printing layer according to the multiple updated color printing route information respectively when printing a 3D model.

Compared with technical scheme of related art, each exemplary embodiment of the present disclosure performs coloring compensation to extension block generated from each sliced object printed, to avoid non-colored contour of a printed full-colored 3D model resulting from lack of coloring range.

BRIEF DESCRIPTION OF DRAWING

One or more exemplary embodiments of the present disclosure are illustrated by way of example and not limitation in the figures of the accompanying drawings, in which like references indicate similar elements. These drawings are not necessarily drawn to scale.

FIG. 1A shows a sectional view of a first 3D object of related art.

FIG. 1B shows a sectional view of a second 3D object of related art.

FIG. 2 shows a diagram of a 3D printer according to an exemplary embodiment of the present disclosure.

DETAILED DESCRIPTION OF THE INVENTION

Figure 3:
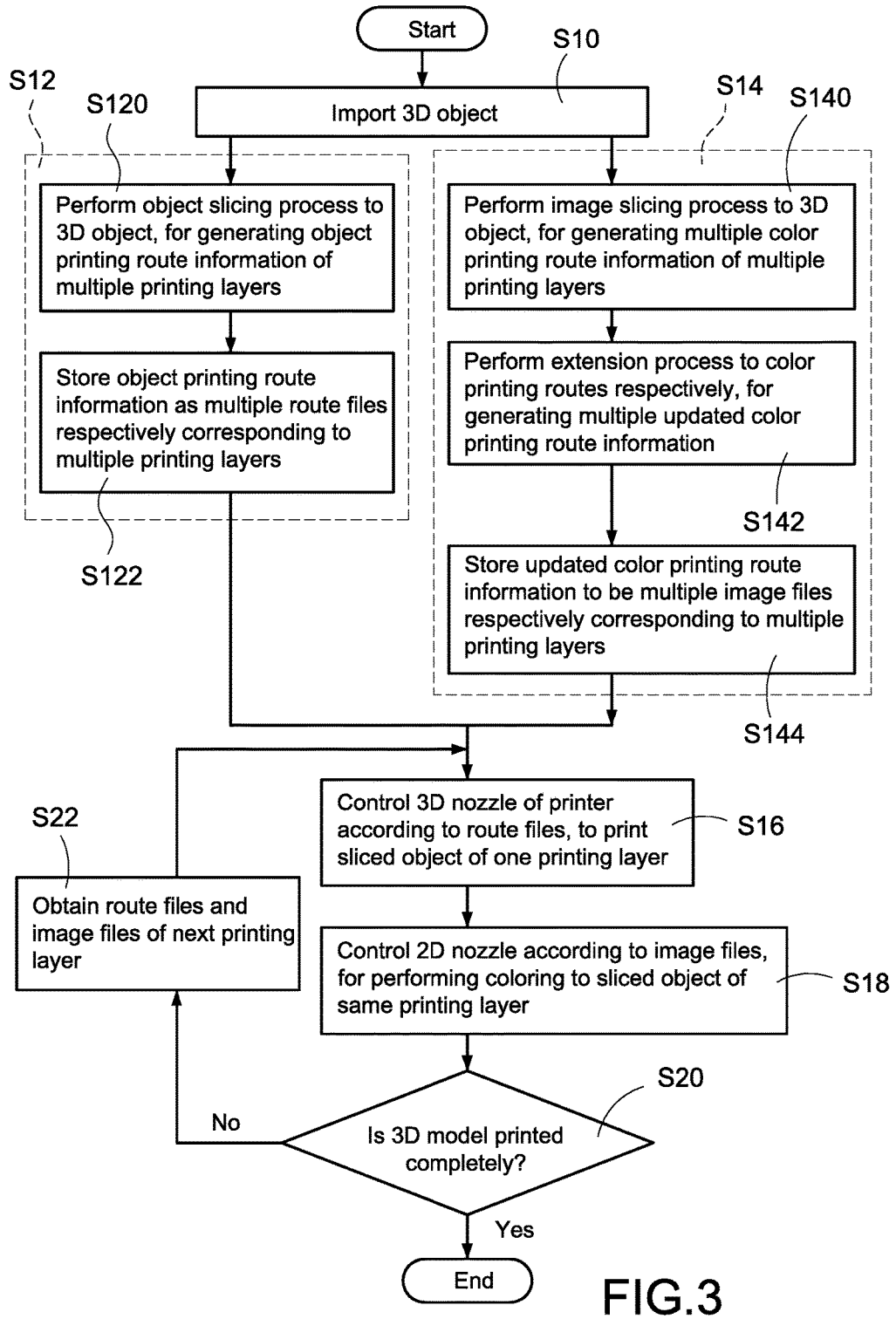
FIG. 3 shows a flowchart of slicing and printing according to an exemplary embodiment of the present disclosure.

The present disclosure discloses a method for compensating a coloring range of a colored 3D object (hereafter "the method"), the method is mainly applied for a 3D printer equipped with a nozzle for spraying forming material and a nozzle for spraying colored ink, and capable of printing a full-colored 3D model.

Refer to FIG. 2, FIG. 2 shows a diagram of a 3D printer according to an exemplary embodiment of the present disclosure. The exemplary embodiment in FIG. 2 discloses a 3D printer (hereafter the printer 2), the printer 2 has a print platform 21, a 3D nozzle 22 is arranged on the print platform 21 for spraying forming material to print 3D object, and a 2D nozzle 23 is arranged on the print platform 21 for spraying different colored ink to perform coloring to 3D object.

The 2D nozzle 23 can be an ink nozzle used by existing plane printer, connected to multiple inkjets at rear side, the multiple inkjets store different colored inks. In an exemplary embodiment, the 2D nozzle 23 can be connected to four inkjets at rear side, the four inkjets respectively store cyan, magenta, yellow and black inks.

In the exemplary embodiment shown in FIG. 2, the printer 2 is a fused deposition modeling (FDM) 3D printer for example, the 3D nozzle 22 uses thermoplastic wires as forming material.

In the exemplary embodiment shown in FIG. 2, the 3D nozzle 22 and the 2D nozzle 23 are arranged on the same control rod 24. Specifically, the 3D nozzle 22 and the 2D nozzle 23 are respectively arranged at two opposite sides of the control rod 24a, and the printer 2 controls the control rod 24 to respectively move the 3D nozzle 22 and the 2D nozzle 23. In other exemplary embodiments, the printer 2 also can be arranged with the multiple control rods, and using the control rods to respectively arrange and control the 3D nozzle 22 and the 2D nozzle 23.

The printer 2 mainly controls the 3D nozzle 22 to print sliced object of each printing layer of a colored 3D object on the print platform 21 layer by layer, and controls the 2D nozzle 23 to perform coloring to each printed sliced object when performing printing.

Please also refer to FIG. 3, FIG. 3 shows a flowchart of slicing and printing according to an exemplary embodiment of the present disclosure. Specifically, FIG. 3 discloses the multiple compensating steps performing coloring range compensating by the printer 2 or a processor of a computer device (not shown) connected to the printer 2, and the multiple print step performing printing and coloring of the 3D object by the printer 2 according to compensated information.

As shown in FIG. 3, a 3D object is imported by the printer 2 or the processor of the computer device first (step S10). The 3D object is mainly an edited 3D object, an entity full-colored 3D model can be printed when the printer 2 performs printing.

After the 3D object imports the 3D object completely, then the processor respectively performs a 3D object process program (step S12) and a 2D image process program (step S14) to the 3D object. In an exemplary embodiment, the processor can perform the 3D object process program first and then perform the 2D image process program, vice versa. In other exemplary embodiments, the processor also performs the 3D object process program and the 2D image process program synchronously by multiplexing process, not limited here.

Specifically, in the 3D object process program, the processor performs an object slicing process to the 3D object, for generating object printing route information of multiple printing layers (step S120). A number of the object printing route information equals to that of the multiple printing layers, that is, each printing layer of the 3D object has a corresponding object printing route information, and each of the object printing route information respectively describes an object contour of the corresponding printing layer.

Then the processor stores the object printing route information as the multiple route files respectively corresponding to the multiple printing layers (step S122). Specifically, the processor stores the multiple route files in a storage unit of the printer 2 or the computer device. In an exemplary embodiment, the processor stores the multiple route files in a portable storage device by a connection port. In another exemplary embodiment, the processor also stores the multiple route files in a database of cloud through network.

In the 2D image process program, the processor performs an image slicing process to the 3D object, for generating multiple color printing route information of multiple printing layers (step S140). A number of the multiple color printing route information equals to that of the multiple printing layers, that is, each printing layer of the 3D object has one corresponding color printing route information, and each of the color printing route information respectively describes an original color contour of the corresponding printing layer.

In an exemplary embodiment, the number of the printing layers generated after the processor performs the image slicing process, and the number of the printing layers generated after the processor performs the object slicing process. The number of the multiple color printing route information equals to that of the object printing route information, and each of the original color contours respectively has printing route the same with or similar to that of the object contour on the same printing layer.

After the step S140, the processor further performs an extension process to the color printing routes respectively, for generating the multiple updated color printing route information (step S142). In the exemplary embodiment, each of the updated color printing route information respectively describes an extended color contour of the corresponding printing layer.

After the step S142, the processor stores, through the above-mentioned storage unit, portable storage device or database, the updated color printing route information to be the multiple image files respectively corresponding to the multiple printing layers (step S144).

Figures 4A, 4B:
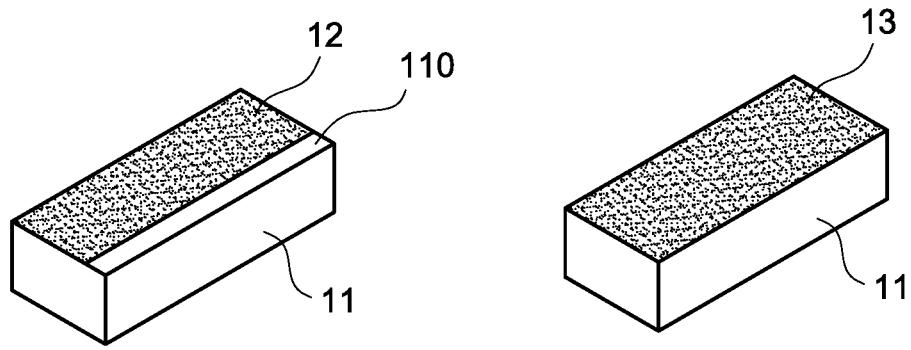
FIG. 4A shows a diagram of the present disclosure before the coloring range before compensating.
FIG. 4B shows a diagram of the present disclosure with the coloring range compensated.

Please also refer to FIG. 4A and FIG. 4B, which respectively shows a diagram of the present disclosure before the coloring range before compensating, and a diagram of the present disclosure with the coloring range compensated. The printer 2 prints an object block 11 according to the route indicated by the object printing route information of a printing layer first, then performs coloring to the object block 11 according to the route indicated by the color printing route information of the same printing layer to perform printing, for generating a coloring block 12 completely covering the object block 11.

As shown in FIG. 4A, after being printed, the printed object block 11 collapse, and extend to form an extension block 110 due to gravity, the weight of the forming material itself, and the molten state. If the printer 2 directly prints the coloring block 12 according to the route indicated by the color printing route information, the coloring block 12 will not cover the extension block 110. The extension block 110 is located at the outer contour range of the full-colored 3D model, thus if the coloring is not correct, appearance of the full-colored 3D model will be effected much.

In step S142 shown in FIG. 3, the method performs the extension process to the color printing route information for generating the updated color printing route information. As shown in FIG. 4B, the printer 2 performs printing according to the route indicated by the updated color printing route information, to form a compensated coloring block 13 on the object block 11. In the exemplary embodiment, the compensated coloring block 13 can completely cover the object block 11 and the extension block 110.

The method of the present disclosure respectively records the updated color printing route information mentioned above to be the image files, thus if the printer 2 controls the 2D nozzle 23 to perform coloring according to the image files, then no outer contour of the printed full-colored 3D model will not be colored.

Refer to FIG. 3 again, after the step S12 and the step S14, the processor completes the compensating program of the coloring range of the 3D object.

The printer 2 can read the route files from the storage unit, the portable storage device or the database during printing, to control the 3D nozzle 22 of the printer 2 according to the route files, to print the sliced object of a printing layer (for example, the first layer) (step S16). In addition, the printer 2 can read the image files from the storage unit, the portable storage device or the database, and can control the 2D nozzle 23 according to the image files when printing the sliced object, for performing coloring to the sliced object of the same printing layer (step S18).

After the sliced object of a printing layer is printed and colored completely, the printer 2 determines if a full-colored 3D model corresponding to the 3D object is printed completely (step S20). That is, the printer 2 determines if printing and coloring of all printing layers of the 3D object is completed. If the full-colored 3D model is not printed completely (that is, the printing layer of the 3D object printed currently is not the last printing layer), then the printer 2 further obtains the route files and the image files of the next printing layer (step S22), and performs the step S16 and the step S18 again, to perform printing and coloring of the next printing layer, this is repeated till the full-colored 3D model is printed completely.

Figure 5:
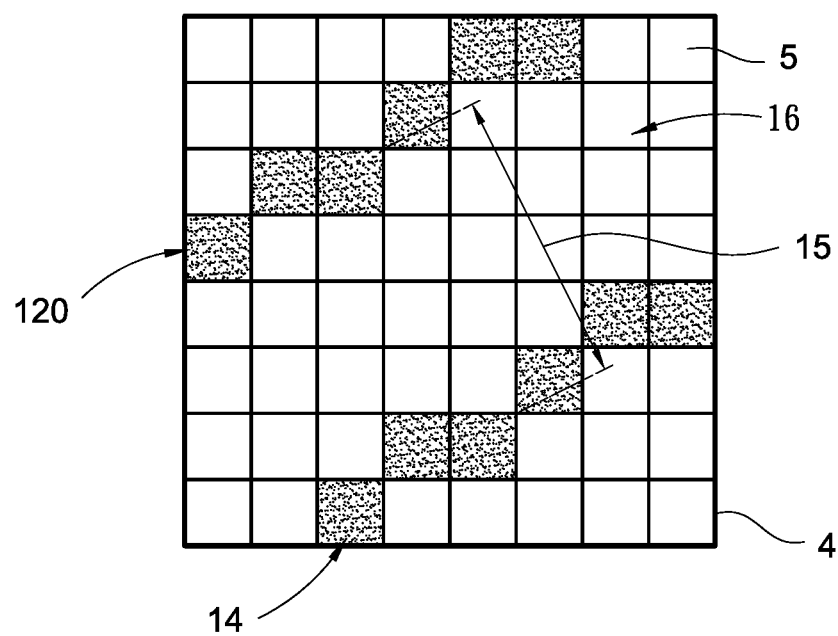
FIG. 5 shows a diagram of extension range according to an exemplary embodiment of the present disclosure.

In the following, please refer to FIG. 5, FIG. 5 shows a diagram of extension range according to an exemplary embodiment of the present disclosure. As mentioned above, the color printing route information describes an original color contour 120 of the corresponding printing layer, while the updated color printing route information describes an extended color contour 14 of the corresponding printing layer. As shown in the exemplary embodiment in FIG. 5, a slicing plane 4 is used for example, and a pixel 5 is used as the smallest unit for example.

As shown in FIG. 5, in an exemplary embodiment, the extended color contour 14 is generated from an extension distance 15 extended from the corresponding original color contour 120, and the extended color contour 14 covers an extension range 16. In the exemplary embodiment, the area of the extension range 16 equals to that of the extension block 110 generated from the printed sliced object on the same printing layer.

In an exemplary embodiment, the extension distance 15 can be exp, wherein e is a predetermined extension parameter of the printer 2, p is a size of the pixel 5 applied to the 3D object. Specifically, different 3D printer can apply different 3D nozzle and different forming material, and forming material spraying from different 3D nozzles can have different extension levels, different forming material spraying from the same 3D nozzle also can have different extension levels. The aforementioned predetermined extension parameter is a parameter set according to the extension level indicated from an experiment performed to the printer 2 used by the method of the present disclosure in advance.

The aforementioned p is the size of the pixel applied to the 3D object, the size of pixels of plane in algorithm actually is determined by developer of the algorithm, if the number of pixels in unit area is larger, then the size of each pixel is smaller, and the outputted color files is more delicate and calculation needs more time.

Figure 6:
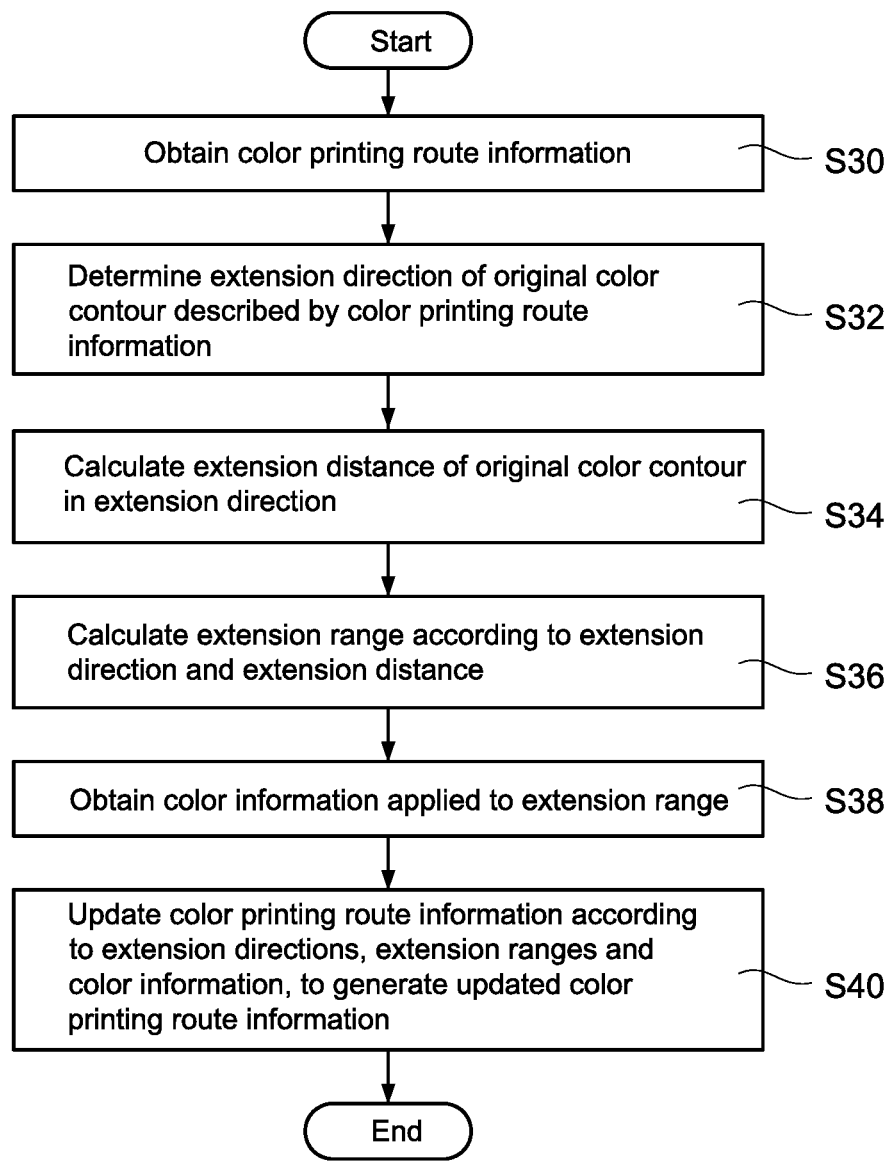
FIG. 6 shows a flowchart of compensation according to an exemplary embodiment of the present disclosure.

Please refer to FIG. 6 in the following, FIG. 6 shows a flowchart of compensation according to an exemplary embodiment of the present disclosure. FIG. 6 further describes how the step S14 in FIG. 3 performs the extension process.

First, after performing the image slicing process, the processor obtains the multiple color printing route information (step S30), then, respectively determines an extension direction of the original color contour described by each of the color printing route information (step S32). The processor further calculates an extension distance of the original color contour in the extension direction (step S34). Then the processor calculates an extension range of each of the original color contour according to each of the extension direction and each of the extension distance respectively (step S36). Besides, the processor also can calculate the corresponding extended color contour according to the original color contour, the multiple extension directions and the extension distance.

Then the processor further obtains a color information applied to each of the extension range (step S38). Finally, the processor updates the multiple color printing route information according to the multiple extension directions, the multiple extension ranges and the multiple color information, to respectively generate the corresponding updated color printing route information (step S40).

During the modeling process of the 3D object, the processor mainly takes the contour of the 3D object as a combination of the multiple triangular plane, thus in the aforementioned step S32, the processor can determine the multiple extension directions by the multiple triangular plane in the 3D object. In the step S38, the processor also can determine the multiple color information by the color of the multiple triangular plane in the 3D object (detail described in the following).

Figure 7:
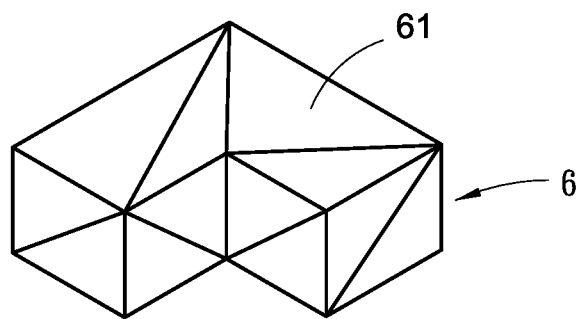
FIG. 7 shows a diagram of a 3D object.

Refer to FIG. 7, FIG. 7 shows a diagram of a 3D object. The exemplary embodiment in FIG. 7 discloses a 3D object 6, and it can be seen from FIG. 7, for the processor, the contour of the 3D object 6 is formed by the multiple triangular planes 61. In other words, the contour and color of the 3D object 6 are determined by configuration of the triangular plane 61. The related technical features of the aforementioned triangular plane is known by skilled in the art of the 3D drawing field, detailed description is not repeated here.

Figure 8:
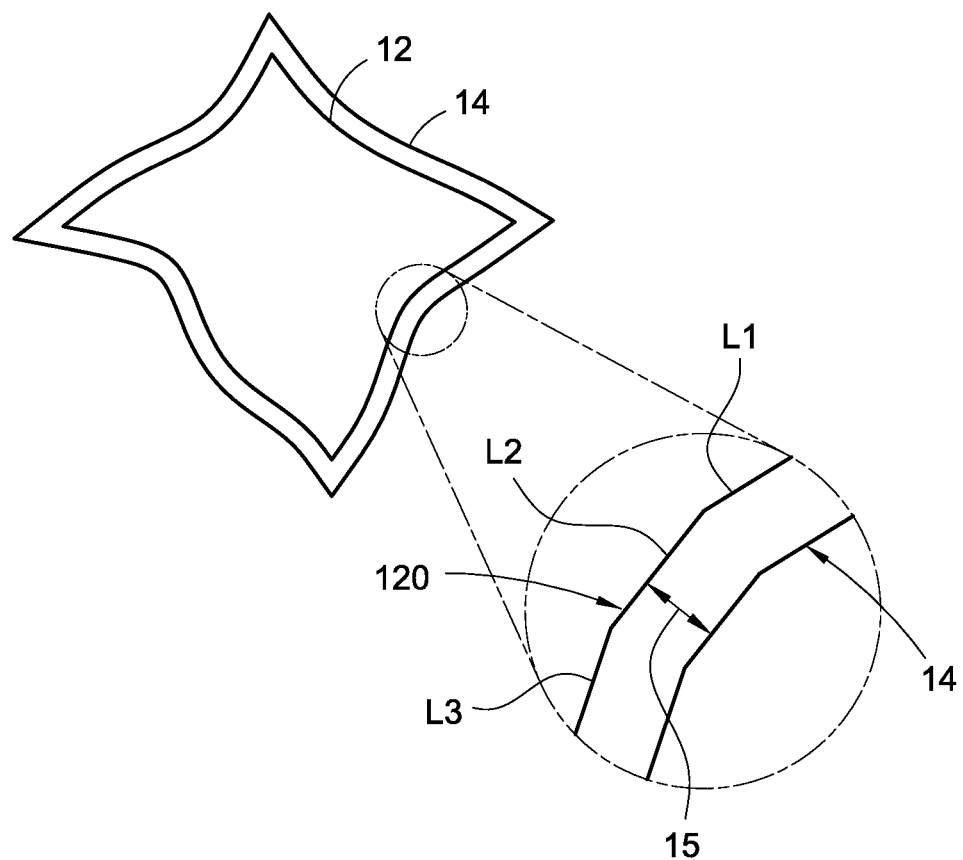
FIG. 8 shows a diagram of a partially amplified contour according to an exemplary embodiment of the present disclosure.

Please refer to FIG. 8, FIG. 8 shows a diagram of a partially enlarged contour according to an exemplary embodiment of the present disclosure. As mentioned above, the color printing route information describes an original color contour 120 of the corresponding printing layer, and the updated color printing route information describes an extended color contour 14 of the corresponding printing layer. The printer 2 performs coloring to the printing layer according to the image files, and performs coloring to the original color contour 120, the extended color contour 14 and the extension range 16 at the same time.

As shown in FIG. 8, if the original color contour 120 is enlarged for description, it can be seen that a curve on the original color contour 120 of a 3D object is formed by the multiple line segments, in the exemplary embodiment shown in FIG. 8, a first line segment L1, a second line segment L2 and a third line segment L3 are used for example. In an exemplary embodiment, the processor mainly respectively performs calculating the extended color contour 14 corresponding to the curve, to each of the line segment L1-L3 on the curve respectively (that is, each of the line segment L1-L3 is on the same original color contour 120, but belongs to different triangular planes).

Figure 9:
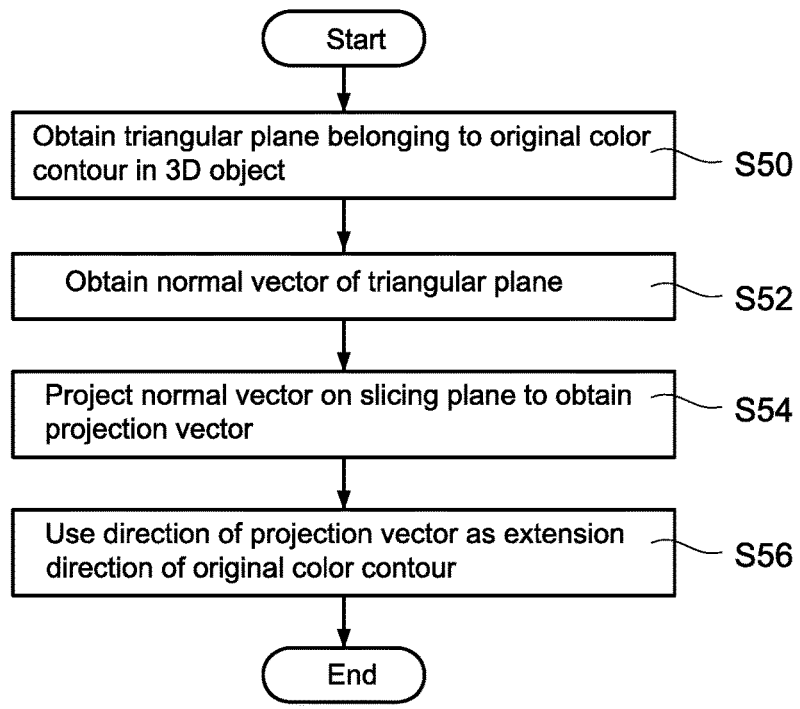
FIG. 9 shows a flowchart of determining extension direction according to an exemplary embodiment of the present disclosure.
Figure 10:
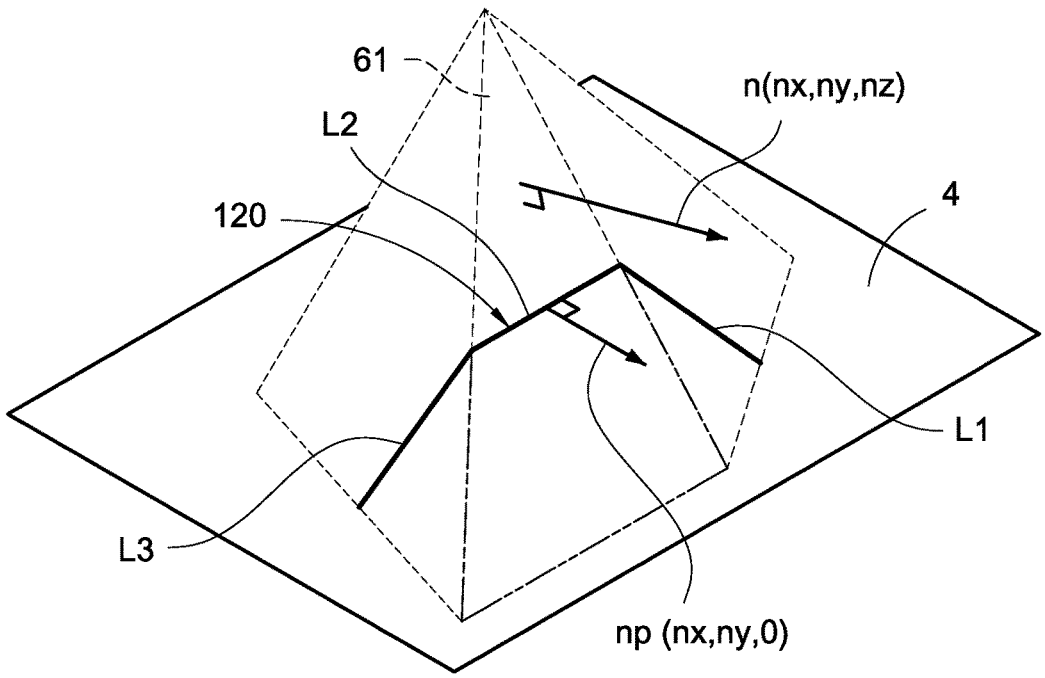
FIG. 10 shows a diagram of extension direction according to an exemplary embodiment of the present disclosure.

Please also refer to FIG. 9 and FIG. 10 together, which respectively shows a flowchart of determining extension direction according to an exemplary embodiment of the present disclosure, and a diagram of extension direction according to an exemplary embodiment of the present disclosure. If the processor determines an extension direction of the original color contour 120 of one of the printing layers (for example, performing the step S32 in FIG. 6), the processor mainly obtains the triangular plane 61 belonging to the original color contour 120 in the 3D object (step S50), that is, determining the triangular plane including and defining the original color contour 120 in the 3D object. In the exemplary embodiment shown in FIG. 9, the second line segment L2 on the original color contour 120 is used for example, but not for limiting the present disclosure.

Next, the processor obtains a normal vector n of the triangular plane 61 (step S52). In the exemplary embodiment shown in FIG. 10, the normal vector n is presumed to be: (nx, ny, nz). Then the processor projects the normal vector n on the slicing plane 4 of the printing layer, to obtain a projection vector np of the triangular plane 61 (step S54). In the exemplary embodiment shown in FIG. 10, the projection vector np is presumed to be: (nx, ny, 0), in other words, the processor can set z-axis component of the normal vector n constantly to be 0, to obtain the projection vector np (that is, z-axis component of the projection vector np is 0).

After the step S54, the processor uses the direction of the projection vector np as the extension direction of the original color contour 120 (step S56). In other words, the extension direction is perpendicular to the original color contour 120, and parallel to the projection vector np of the original color contour 120.

It should be noted that the 3D object is formed by the sliced object of multiple printing layers, the aforementioned step S50 to step S56 needs to be performed to the original color contour 120 on each sliced object, to find out the extension direction of each of the original color contour 120. Furthermore, the original color contour 120 in a printing layer can be formed by the multiple triangular planes, that is, the multiple line segments on the original color contour 120 can respectively belong to different triangular planes, thus different line segments can have different extension directions.

Figure 11:
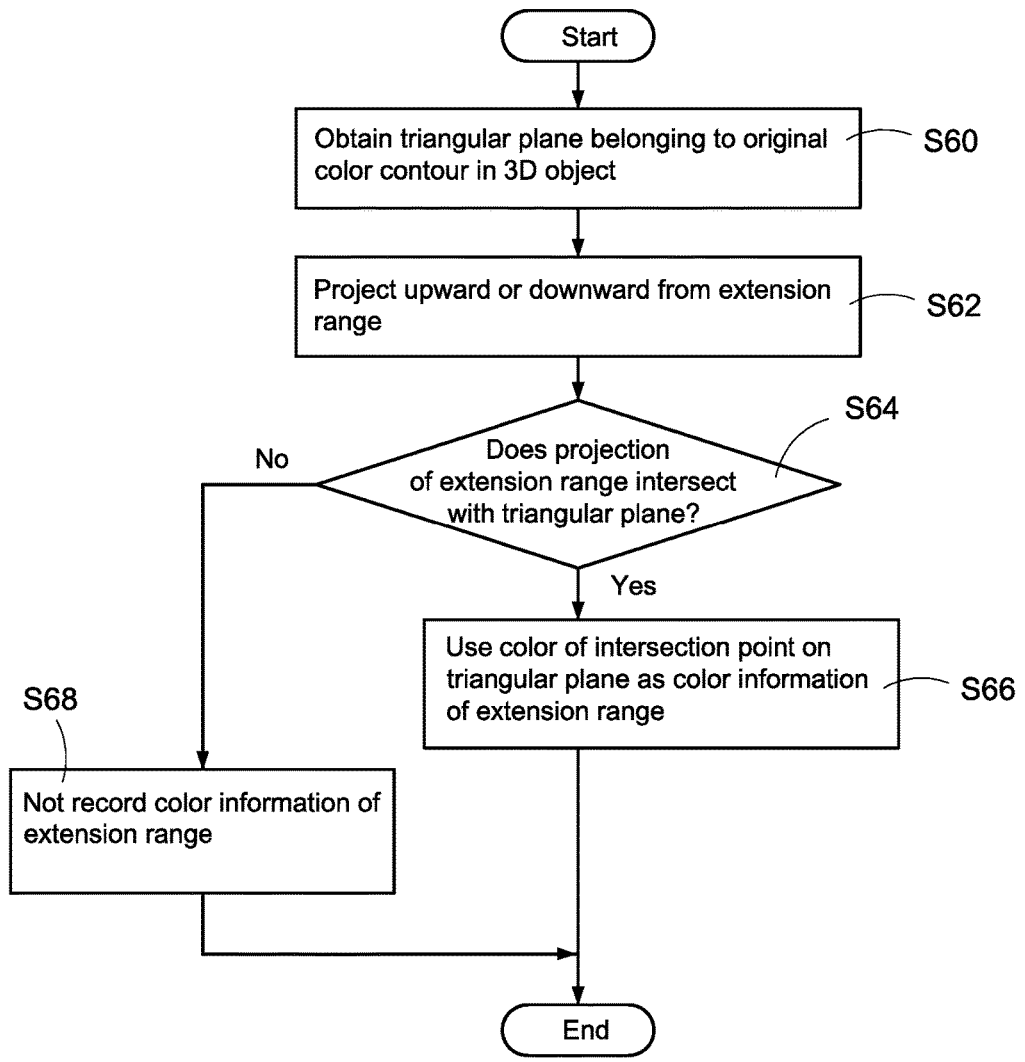
FIG. 11 shows a flowchart of determining color of an extension range.
Figure 12:
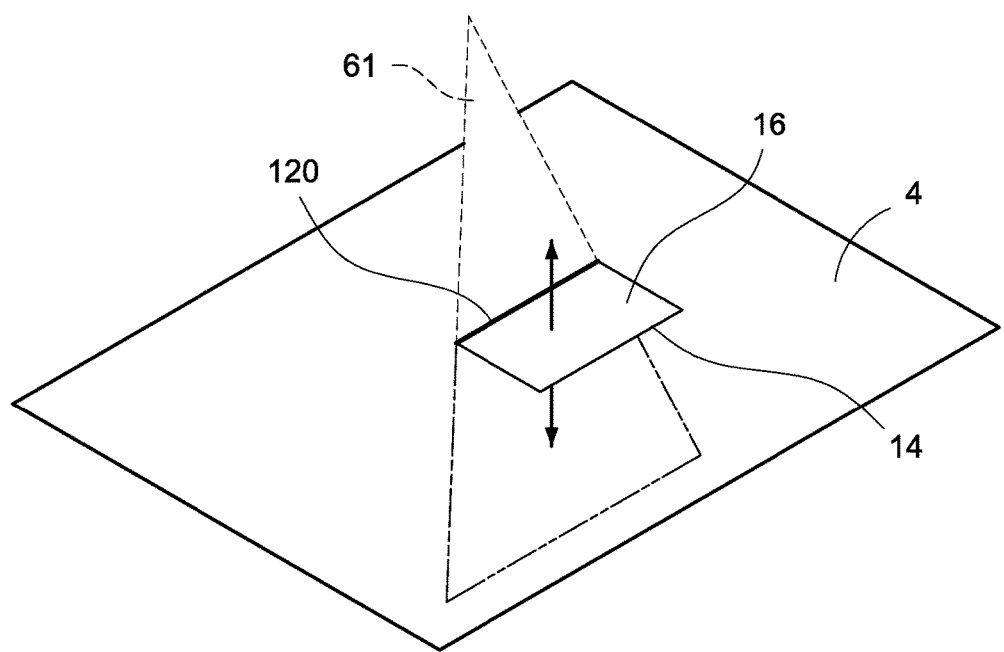
FIG. 12 shows a diagram of an extension range according to another exemplary embodiment of the present disclosure.

Please also refer to FIG. 11 and FIG. 12, which respectively shows a flowchart of determining color of an extension range, and a diagram of an extension range according to another exemplary embodiment of the present disclosure. If the processor determines a color information of an extension range 16 of the original color contour 120 (for example, performing the step S38 in FIG. 6), the processor mainly obtains the triangular plane 61 belonging to the original color contour 120 in the 3D object (step S60). Then, projection is performed upward or downward from the known extension range 16 (step S62). Specifically, projection is performed upward or downward from each pixel point in the extension range 16 respectively.

After the step S62, the processor determines if the projection of the extension range 16 intersects with the triangular plane 61 (step S64). If the projection of the extension range 16 intersects with the triangular plane 61, then the color of the intersection point on the triangular plane 61 is used as the color information of the extension range 16 (step S66). Specifically, the step S66 uses the color on the intersection point of the triangular plane 61 as the color of the pixel point, when the projection is performed on any pixel point on the extension range 16 and the projection intersects with the triangular plane 61.

Otherwise, if the projection of the extension range 16 does not intersect with the triangular plane 61 (for example, the triangular plane 61 is very flat, or parallel to the slicing plane 4 (z-axis is 0)), then the processor does not record the color information of the extension range 16 (step S68).

In the aforementioned exemplary embodiment, the processor mainly refers to the color of the triangular plane 61 corresponding to the original color contour 120, and determines the color of each pixel point in the extension range 16. In other exemplary embodiments, the processor also can directly replicate the color of the original color contour 120, to directly use it as the color information of each pixel point in the extension range 16. In the exemplary embodiment, the work loaded by the processor can be substantially reduced. However, the calculating method using the triangular plane 61 to determine the color of the extension range 16 can make the color of the extension range 16 be closer to the actual appearance of the 3D object.

The method disclosed by each exemplary embodiment of the present disclosure can effectively compensate the color of the extension block generated from each printed sliced object, and can make the appearance of the printed full-colored 3D model be more accurate.

Thus, particular exemplary embodiments have been described. Other exemplary embodiments are within the scope of the following claims. For example, the actions recited in the claims may be performed in a different order and still achieve desirable results.

What is claimed is:

1. A method for compensating a coloring range of a colored 3D object, the method comprising:
 a) importing a 3D object (1) by a processor;
 b) performing an object slicing process to the 3D object (1), for generating multiple object printing route information of multiple printing layers;
 c) performing an image slicing process to the 3D object (1), for generating multiple color printing route information of multiple printing layers, wherein each of the multiple color printing route information respectively describes an original color contour (120) of each of the printing layers;
 d) performing an extension process to the multiple color printing route information respectively, for generating multiple updated color printing route information, wherein each of the updated color printing route information respectively describes an extended color contour (14) of each of the printing layer, each extended color contour (14) is respectively formed by extending each original color contour (120) in an extension direction with an extension distance (15), and extends a coloring range of each original color contour (120) for compensating the color of an object portion that cannot be covered by the original color contour (120), wherein each of the extended color contours (14) covers an extension range (16), an area of the extension range (16) equals to an area of an extension block (110) automatically formed when a printed object of each printing layer collapses after being printed due to gravity, weight, and molten state, and the extension block (110) is the object portion that cannot be covered by the original color contours (120); and e) storing the multiple object printing route information as multiple route files, and storing the multiple updated color printing route information as multiple image files by a storage unit.

2. The method for compensating the coloring range of the colored 3D object of claim 1, wherein the extension distance (15) is exp, wherein e is a predetermined extension parameter used by a 3D printer (2) printing the 3D object (1), p is a value of a pixel (5) used by the 3D object (1).

3. The method for compensating the coloring range of the colored 3D object of claim 1, wherein the step d comprises the following steps:
   d1) obtaining the multiple color printing route information;
   d2) determining the extension direction of each of the original color contours (120);
   d3) calculating the extension distance (15) of each of the original color contour (120);
   d4) calculating the extension range (16) according to each of the original color contours (120) and each of the extension distances (15);
   d5) obtaining a color information used by each of the extension ranges (16); and
   d6) updating the multiple color printing route information according to the multiple extension directions, the multiple extension ranges (16) and the multiple color information, for generating the multiple updated color printing route information.

4. The method for compensating the coloring range of the colored 3D object of claim 3, wherein the step d2 comprises the following steps:
   d21) obtaining a triangular plane (61) corresponding to each of the original color contours (120) in the 3D object (1);
   d22) obtaining a normal vector of each of the triangular planes (61);
   d23) projecting each of the normal vectors to a slicing plane (4) of the 3D object (1) for respectively obtaining a projection vector of each of the triangular planes (61); and
   d24) using a direction of each of the projection vectors as each of the extension direction of the original color contour (120) respectively.

5. The method for compensating the coloring range of the colored 3D object of claim 4, wherein a z-axis component of each of the projection vectors is 0.

6. The method for compensating the coloring range of the colored 3D object of claim 3, wherein step d5 replicates a color of each of the original color contours (120) for respectively being the color information of each of the extension ranges (16).

7. The method for compensating the coloring range of the colored 3D object of claim 3, wherein step d5 comprises the following steps:
   d51) obtaining a triangular plane (61) corresponding to each of the original color contours (120) in the 3D object (1);
   d52) performing projecting up or down by each of the extension ranges (16);
   d53) using a color of the triangular plane (61) on the intersection as the color information of the extension range (16) when an intersection generated by a projection of any one of the extension ranges (16), and the triangular plane (61) corresponding to the projection; and
   d54) stopping recording the color information of the extension range (16) when no intersection generated by a projection of any one of the extension ranges (16), and the triangular plane (61) corresponding to the projection.

8. The method for compensating the coloring range of the colored 3D object of claim 1, wherein the method further comprises:
   f) controlling a 3D nozzle (22) of a 3D printer (2) to print a sliced object of each of the printing layers layer by layer according to the multiple route files; and
   g) controlling a 2D nozzle (23) of a 3D printer (2) to perform coloring to the sliced object of the same printing layer respectively according to the multiple image files.

9. The method for compensating the coloring range of the colored 3D object of claim 8, wherein the 3D printer (2) is a fused deposition modeling (FDM) 3D printer.

* * * * *